United States Patent [19]

Townsend

[11] 4,455,928
[45] Jun. 26, 1984

[54] MEANS FOR INJECTING FLUIDS INTO FOOD PRODUCTS

[75] Inventor: Ray T. Townsend, Des Moines, Iowa

[73] Assignee: Townsend Engineering Company, Des Moines, Iowa

[21] Appl. No.: 431,216

[22] Filed: Sep. 30, 1982

[51] Int. Cl.³ .......................... A23B 4/00; A23L 1/31; A23L 3/34
[52] U.S. Cl. .......................................... 99/533; 99/535
[58] Field of Search ................. 99/487, 516, 532, 533, 99/535; 17/25, 51; 426/262, 264, 281, 652, 513, 231

[56] References Cited

U.S. PATENT DOCUMENTS 3,919,931 11/1975 Liljenberg .............................. 99/533
4,220,669 9/1980 Townsend ......................... 99/533 X
4,286,510 9/1981 Prosenbauer ......................... 99/533

*Primary Examiner*—Timothy F. Simone
*Attorney, Agent, or Firm*—Zarley, McKee, Thomte, Voorhees & Sease

[57] ABSTRACT

A means for injecting fluid into food products is described. The machine comprises a support having a conveyor mounted thereon for conveying the food product from the rearward thereof toward the forward end thereof. A first fluid manifold is movably mounted on the frame above the conveyor and is movable between upper and lower positions wtih respect to the conveyor. A second fluid manifold is movably mounted on the frame above the conveyor rearwardly of the first fluid manifold. A linkage connects the first and second manifolds to a source of power so that the first and second fluid manifolds are 180° out of phase with each other. Each of the first and second fluid manifolds comprises a plurality of smaller individual fluid manifolds which are individually fluidly connected to the source of injection fluid. Each of the individual fluid manifolds includes a stripper plate assembly which not only strips the food product from the needles but which functions as a fluid control valve so that injection fluid is injected into the food product only after the injection needles have moved a predetermined distance into the food product and halts the flow of fluid to the needles at a predetermined depth as the needles are being withdrawn from the food product. The machine includes means for continuously moving the conveyor and for permitting the fluid manifolds to move with the food product as the injection needles are penetrating the food product.

27 Claims, 12 Drawing Figures

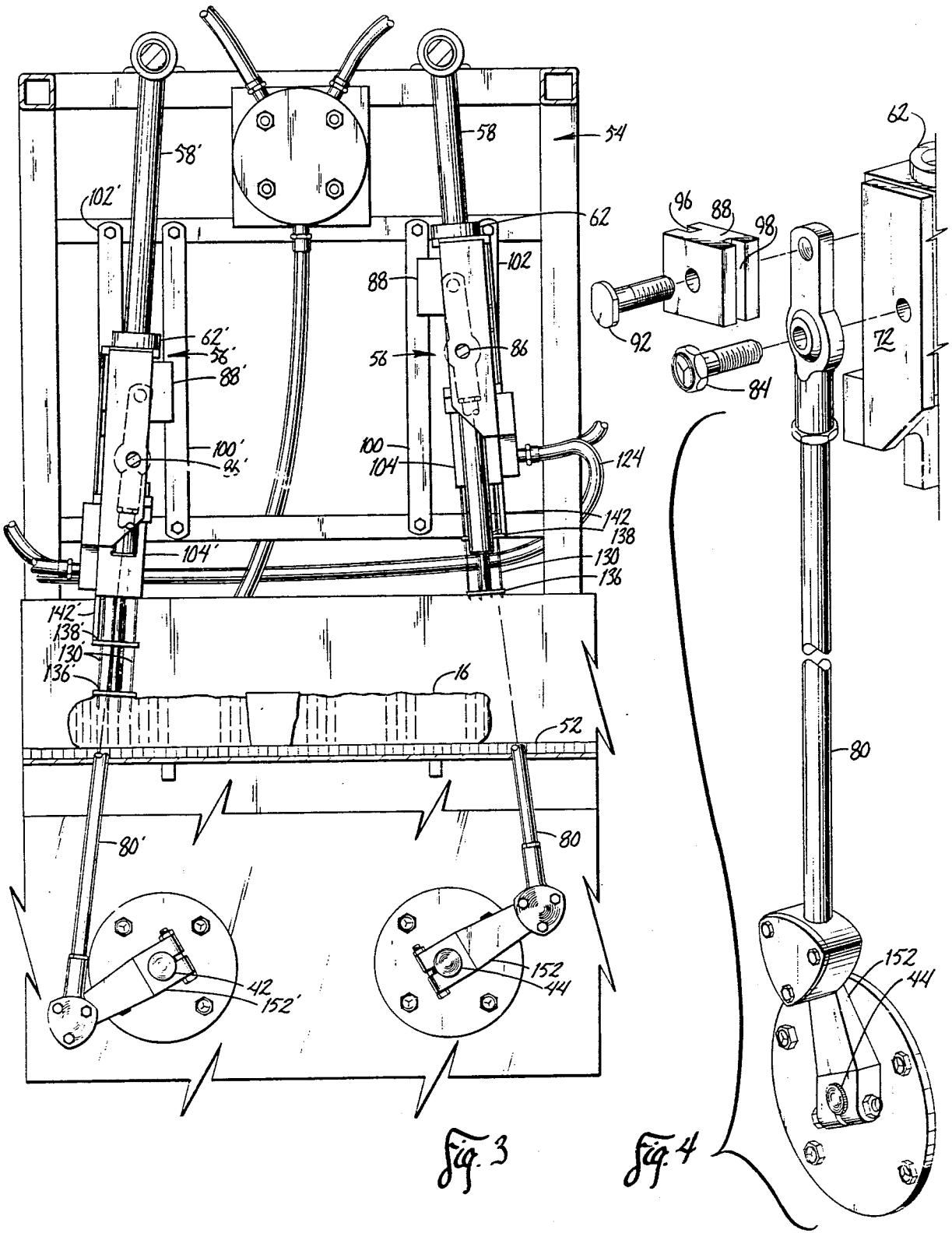

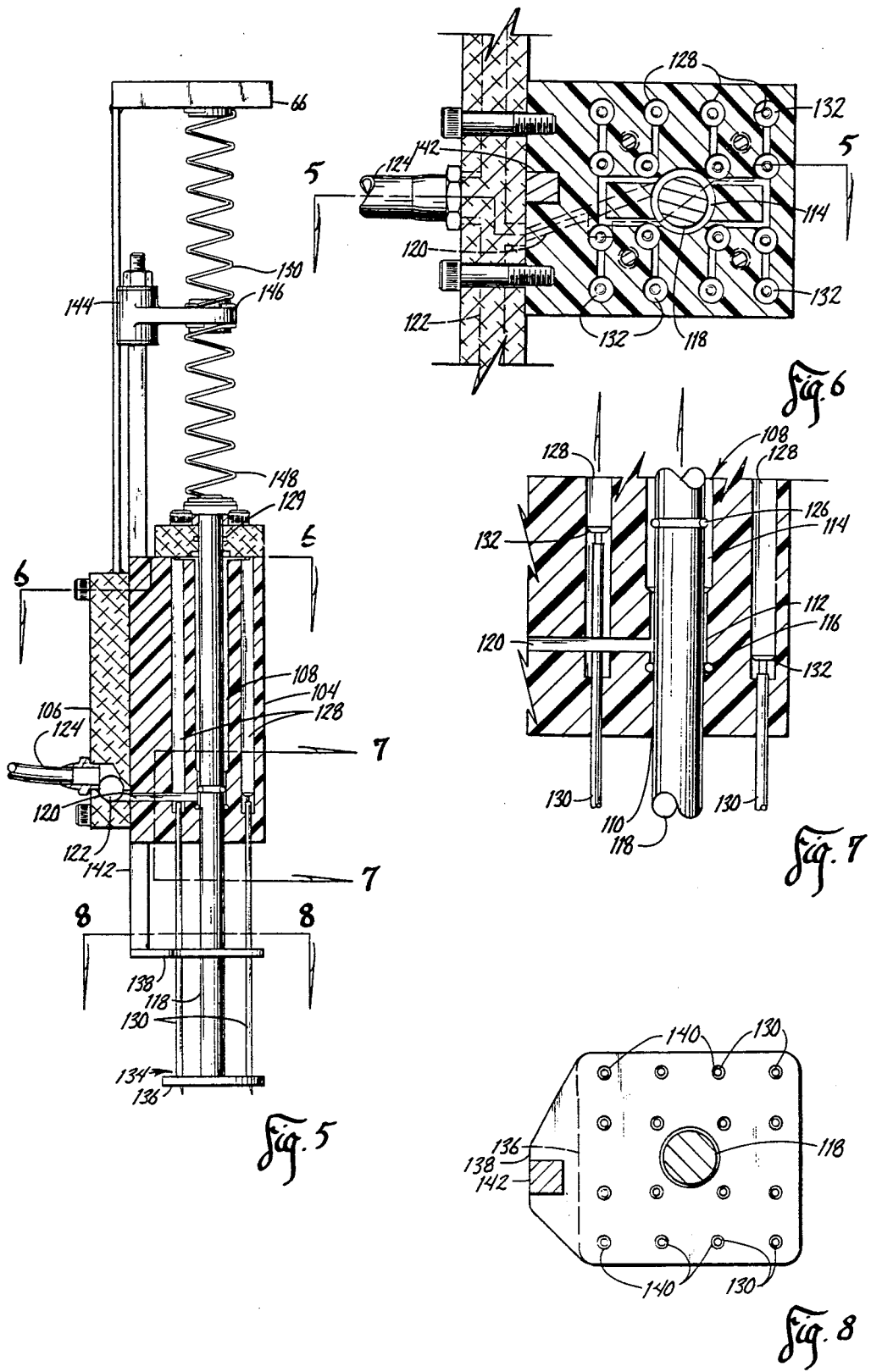

MEANS FOR INJECTING FLUIDS INTO FOOD PRODUCTS

BACKGROUND OF THE INVENTION

This invention relates to a means for injecting fluid into food products such as meat, poultry, etc. At the present time, the general accepted method of curing meat and other food products is to inject the product, through a series of needles, with a pickle or curing solution, and then curing the product is a smokehouse. It is extremely desirable that a controlled amount of fluid be injected into the product.

In U.S. Pat. No. 3,863,556, applicant disclosed a machine for injecting fluid into the meat products and the same has met with considerable success. Although the machine of applicant's earlier patent has met with considerable success, a problem associated with the same is that the weight of the fluid manifold or cross head prevents the same from being moved upwardly and downwardly at a rapid rate without creating undue vibration in the machine. Further, in applicant's earlier machine, the conveyor belt was moved in increments which created inertia problems at high production speeds due to the acceleration of the conveyor becoming excessive and the inertia force of the meat product overcoming the conveying friction with slippage occurring.

A further shortcoming of the prior art is that ordinarily only a few large stripper plates or pads are employed with each of the stripper plates controlling the flow of injection fluid through the needles associated with those particular stripper plates. Still another disadvantage of the prior art is that it has been difficult to precisely control the flow of injection fluid so that the needles are allowed to penetrate the product before fluid begins to flow as well as halting the flow of fluid before the needles leave the meat product.

Therefore, it is a principal object of the invention to provide an improved means for injecting fluids into food products such as meat, poultry, etc.

Another object of the invention is to provide a machine for injecting fluid into food products wherein the food product conveyor is moved continuously.

A further object of the invention is to provide a machine for injecting fluids into food products wherein a pair of transversely mounted fluid manifold assemblies extend across the conveyor with one of the assemblies being positioned rearwardly of the other assembly.

Still another object of the invention is to provide a machine for injecting fluids into food products wherein first and second fluid manifolds or cross heads are employed with the fluid manifolds being 180° out of phase with respect to each other.

Still another object of the invention is to provide a machine for injecting fluids into food products wherein a large number of individual fluid manifolds are employed to insure precise metering of the injection fluid into the food product.

Still another object of the invention is to provide a machine for injecting fluids into food products wherein the fluid manifolds are reciprocated in a generally circular path to permit the fluid manifolds to move with the food product as the food product is being conveyed therebeneath.

Still another object of the invention is to provide a machine for injecting fluids into food products which includes means for preventing the flow of injection fluid into the food product until after the needles have penetrated the food product to a predetermined depth and which stops the flow of injection fluid to the needles prior to the needles leaving the food product.

Still another object of the invention is to provide a machine for injecting fluids into food products including a plurality of injection needles which are yieldably urged downwardly by the pressure of the injection fluid.

Still another object of the invention is to provide a machine for injecting fluid which is durable in use and refined in appearance.

These and other objects will be apparent to those skilled in the art.

BRIEF DESCRIPTION OF THE DRAWINGS

FIG. 3 is an enlarged sectional view seen on lines 3—3 of FIG. 2:

FIG. 4 is an exploded perspective view of the linkage which connects the fluid manifolds to the power source:

FIG. 5 is a sectional view as seen on lines 5—5 of FIG. 4:

FIG. 6 is a sectional view seen on lines 6—6 of FIG. 5:

FIG. 7 is a sectional view seen on lines 7—7 of FIG. 5:

FIG. 8 is a sectional view seen on lines 8—8 of FIG. 5:

SUMMARY OF THE INVENTION

Figure 1:
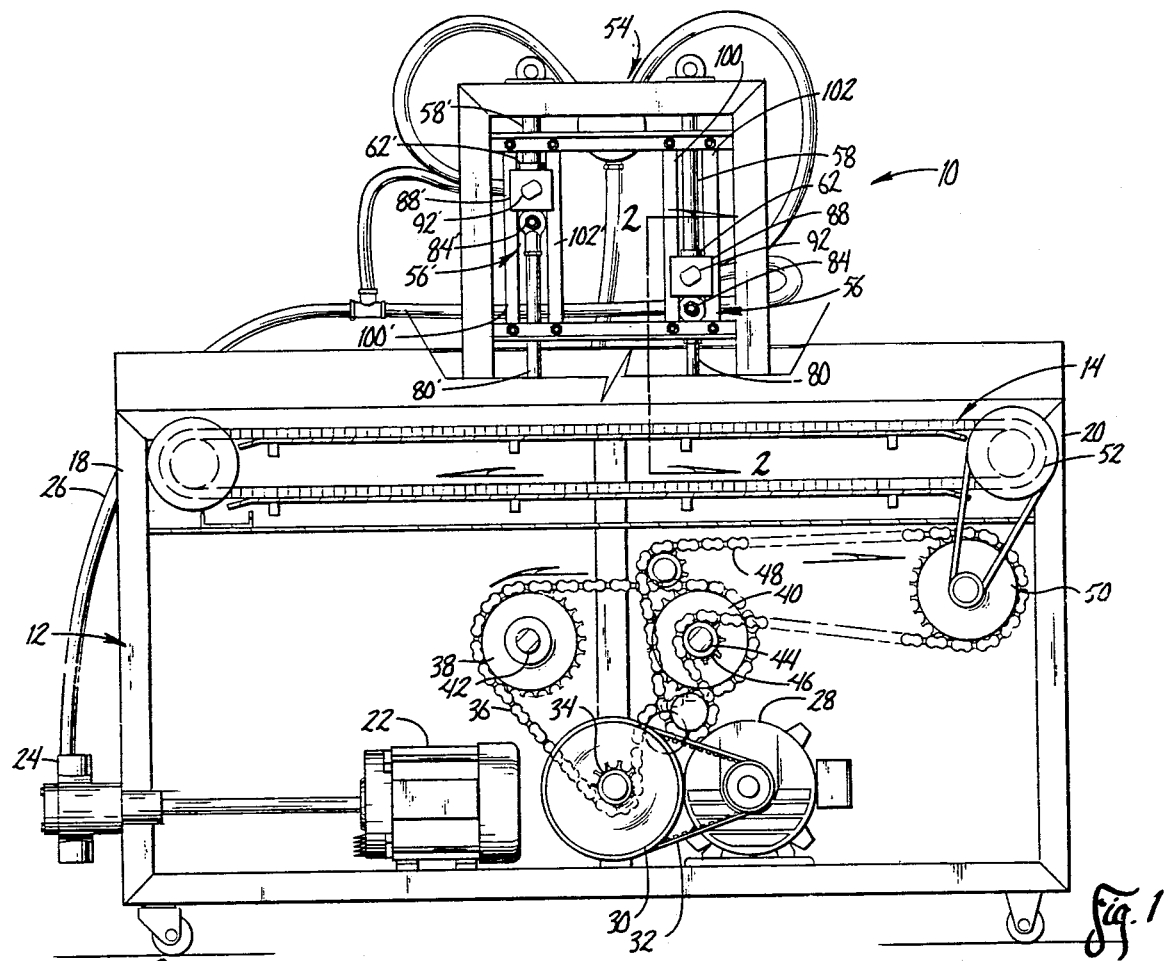
FIG. 1 is a side view of the injection machine of this invention.
Figure 2:
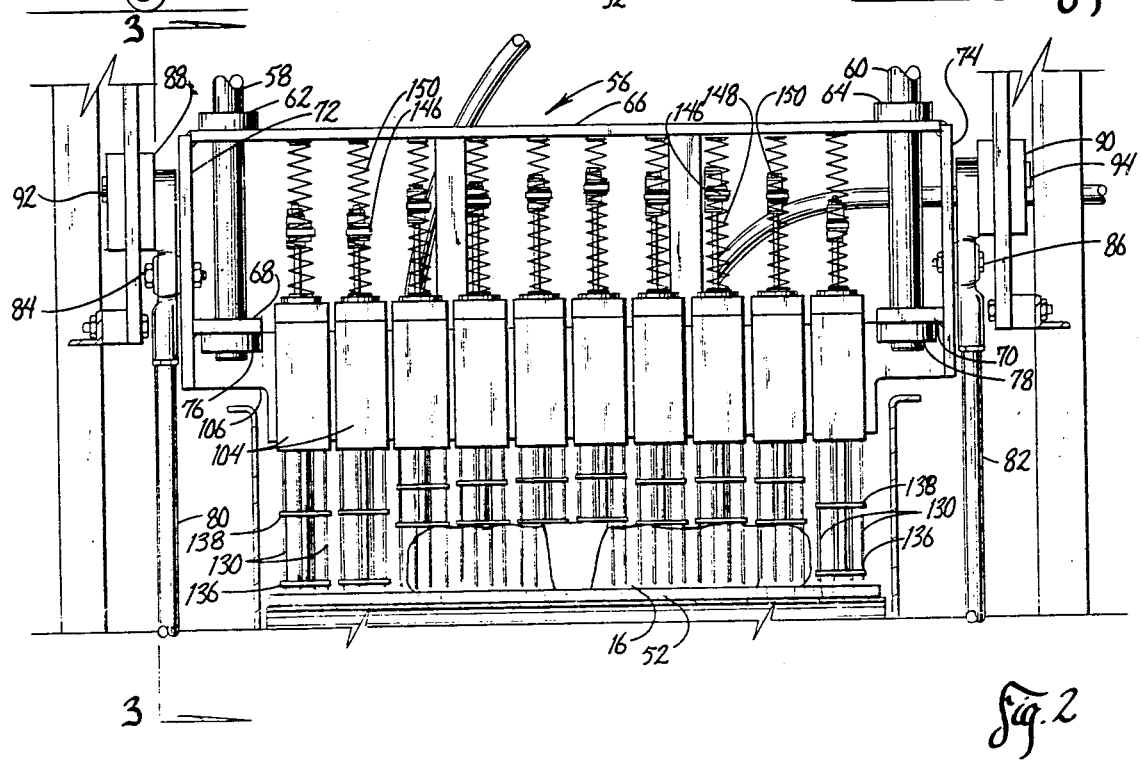
FIG. 2 is an enlarged sectional view seen on lines 2—2 of FIG. 1.
Figure 9:
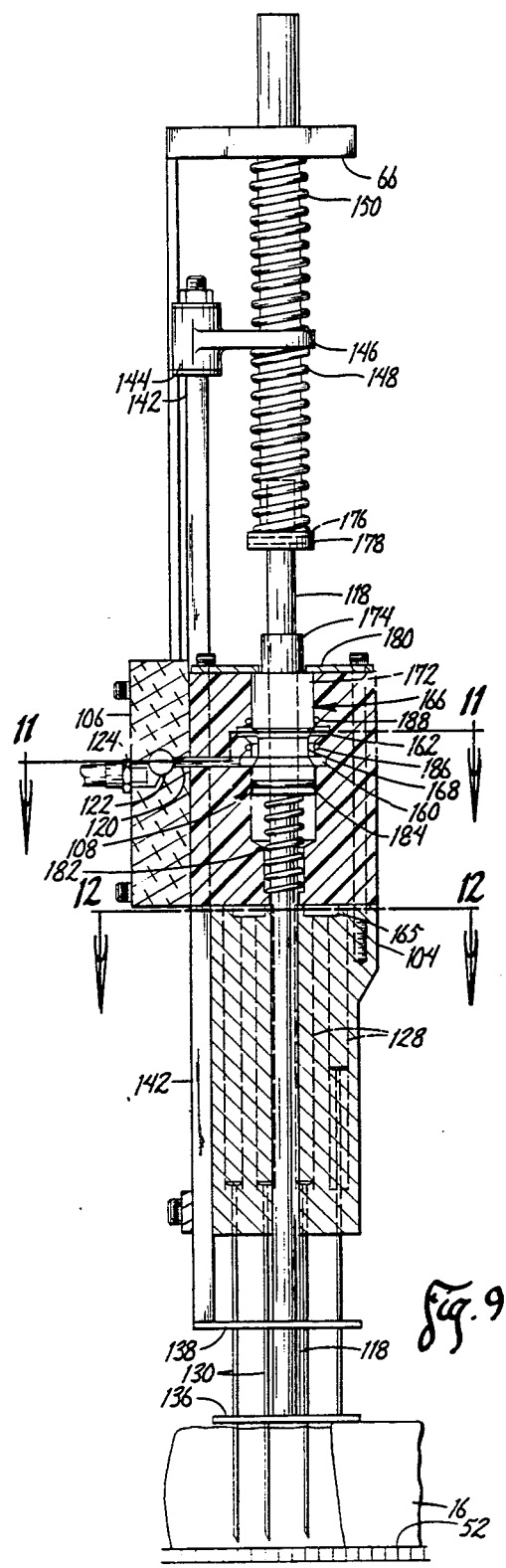
FIG. 9 is a sectional view similar to that of FIG. 5, but shows an alternate form of the invention.
Figure 10:
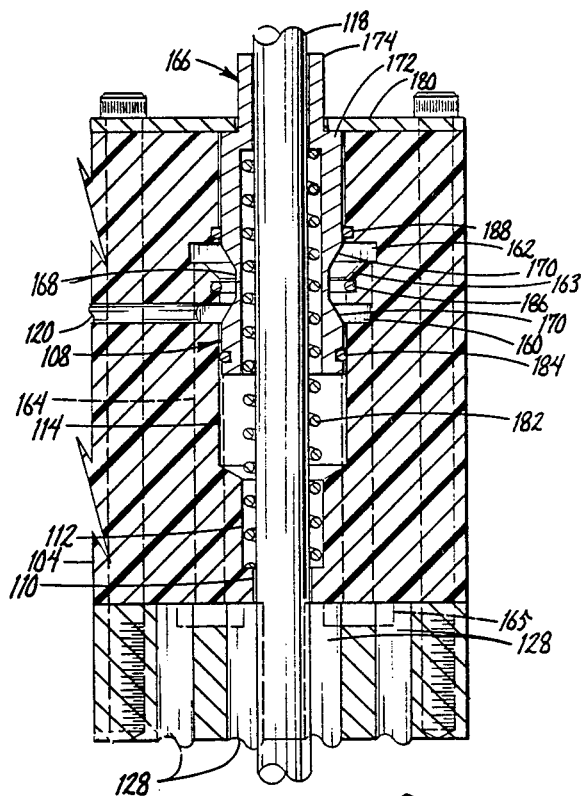
FIG. 10 is a partial sectional view at an enlarged scale of a portion of FIG. 9.
Figure 11:
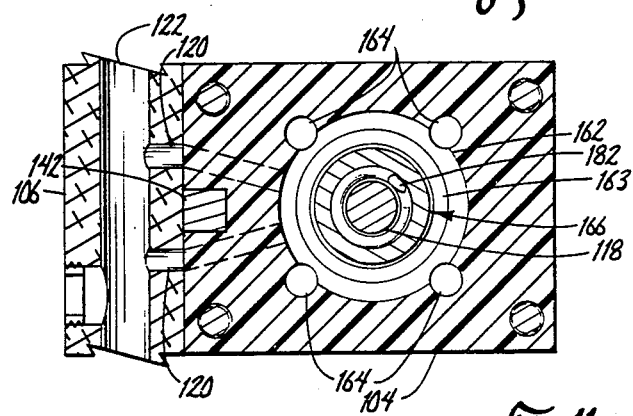
FIG. 11 is an enlarged scale sectional view taken on line 11—11 of FIG. 9.
Figure 12:
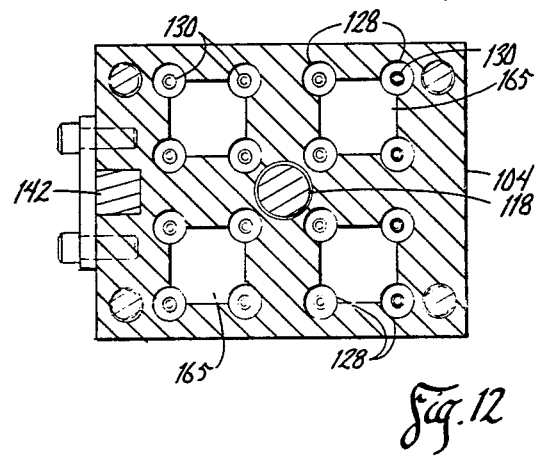
FIG. 12 is an enlarged scale sectional view taken on line 12—12 of FIG. 9.

A means for injecting fluid into food products is described including a frame means having a continuously moving conveyor mounted thereon which conveys the food product from the rearward end thereof to the forward end thereof. First and second fluid manifolds or cross heads assembled 180° out of phase are vertically movably mounted on the frame means over the conveyor with the second fluid manifold means being mounted rearwardly of the first fluid manifold means. Each of the fluid manifold means is comprised of a plurality of individual fluid manifolds which include stripper plates mounted thereon which are movable therewith to engage the upper surface of the food product. A stripper stem extends upwardly from the stripper plate through the fluid manifold and functions as a valve so that injection fluid is injected into the food product only after the needles have penetrated the food product to a predetermined depth. The valve also halts the flow of injection fluid to the needles prior to the needles leaving the food product. The fluid manifolds are vertically movably mounted and pivotally connected to the frame means so that they are reciprocated in a generally circular path to enable the fluid manifold and needles to move with the food product as the injecting needles are penetrating the food product.

DESCRIPTION OF THE PREFERRED METHOD AND MEANS

The machine for injecting fluids into food products such as meat, poultry, etc. is generally indicated by the reference numeral 10. Machine 10 comprises a wheeled frame means 12 including an endless conveyor 14 which is movably mounted thereon to enable the food product 16 to be continuously conveyed from the rearward end 18 of the machine to the forward end 20 of the machine. The numeral 22 refers to a motor mounted on the frame means 12 which is connected to pump 24 having conduit 26 extending therefrom. Pump 24 is in communication with a source of injection fluid.

Motor 28 is also mounted on frame means 12 and is operatively connected to a pulley 30 by means of belt 32. Sprocket 34 is mounted for rotation with pulley 30 and has chain 36 extending therearound. Chain 36 extends around sprockets 38 and 40 which are mounted on shafts 42 and 44 respectively which are suitably rotatably mounted on the frame means 12. Sprocket 46 is mounted for rotation with shaft 44 and has chain 48 extending therearound which drives sprocket 50 which in turn drives pulley 52 of conveyor 14.

A fluid manifold supporting frame 54 extends over the conveyor 14 as illustrated. A pair of cross heads or fluid manifolds 56 and 56' are vertically movably mounted on the frame 54 and are identical except that the cross heads 56 and 56' are 180° out of phase with respect to each other so that cross head 56 will be in its uppermost position when cross head 56' is in its lowermost position and vice versa.

Inasmuch as cross heads 56 and 56' are identical, only cross head 56 will be described in detail with corresponding structure on cross head 56' being indicated by "'". Cross head 56 includes a pair of shafts 58 and 60 which are pivotally connected at their upper ends to the upper end of frame 54 and which extend downwardly therefrom. Shafts 58 and 60 extend through guides 62 and 64 which are mounted on the upper surface of a transversely extending bar 66. Shafts 58 and 60 extend through bar 66 and extend through brackets 68 and 70 which extend inwardly from plates 72 and 74 respectively, the upper ends of which are secured by welding or the like to the opposite ends of bar 66. Collars 76 and 78 are mounted on the lower ends of shafts 58 and 60 below brackets 68 and 70.

The numerals 80 and 82 refer to connecting rods which are pivotally connected to plates 72 and 74 respectively by means of bolts 84 and 86 respectively extending through the connecting rods 80 and 82 below the upper ends thereof. The upper end of connecting rods 80 and 82 are pivotally secured to guides 88 and 90 by means of bolts 92 and 94. As seen in the drawings, the sides of each of the guides 88 and 90 are provided with channels 96 and 98 formed therein. As seen in FIG. 4, the channels 96 and 98 slidably receive the vertically disposed bars 100 and 102 mounted on the frame 54.

A relatively large number of individual fluid manifolds 104 are secured to cross member 106 which is secured to and extends between the lower ends of plates 72 and 74. Each of the fluid manifolds 104 is provided with a vertically disposed bore 108 extending upwardly therethrough. For purposes of description, bore 108 will be described as having a lower end portion 110, reduced diameter portion or first intermediate bore portion 112 and enlarged diameter portion or second intermediate bore portion 114. A seal 116 is provided at the lower end of reduced diameter portion 112 which embraces rod or shaft 118 extending through bore 108 as best seen in FIG. 7. A horizontally extending bore or passageway 120 is in communication with reduced diameter portion 112 above seal 116 and is in communication with port or passageway 122 extending through cross member 106. Passageway 122 is in communication with conduit 124 which is in operative communication with the conduit 26. Thus, actuation of the motor 22 operates pump 24 so that injection fluid is supplied to passageway 122, passageway 120 and the bore 108. O-ring 126 is mounted on rod 118 in such a manner so that O-ring 126 will be positioned above passageway 120 when rod 118 is in its lowermost position as illustrated in FIG. 5. As seen in FIG. 5, when rod 118 is in its lowermost position, O-ring 126 sealably engages the inside wall surface of reduced diameter portion 112 to prevent injection fluid from being supplied to the enlarged diameter portion 114 of bore 108. The upper end of enlarged diameter portion 114 of bore 108 is in communication with the upper ends of a plurality of vertically disposed needle bores 128, each of which has an injector needle 130 movably mounted therein. Seal 129 embraces the upper end of rod 118 to prevent fluid from escaping outwardly therearound. Each of the injector needles 130 has an enlarged head portion 132 at its upper end which engages the inside wall surface of the bore 128 so that the fluid pressure in bore 128 will cause the needle 130 to be yieldably moved downwardly to its lowermost injecting position as will be described in more detail hereinafter.

A stripper plate assembly 134 is secured to the lower end of each of the rods 118 and comprises a pair of plates 136 and 138 secured to the rod 118. Each of the plates 136 and 138 have a plurality of needle openings 140 formed therein through which the needles 130 extend. Plate 138 has a bar 142 secured thereto which extends upwardly therefrom. Collar 144 is mounted on the upper end of bar 142 and has a horizontally extending ear 146 provided thereon which engages the upper end of spring 148 and the lower end of spring 150. The lower end of spring 148 is in engagement with the upper end of rod 118 while the upper end of spring 150 is in engagement with the underside of bar 66.

A crank arm 152 is pivotally connected to the lower end of the connecting rod 80 and is operatively connected to the shaft 44. The lower end of connecting rod 80' is pivotally connected to crank arm 152' which is operatively connected to shaft 42. As seen in FIG. 3, the crank arms 152 and 152' are positioned so as to be out of phase 180° with respect to each other so that cross head 56 will be in its uppermost position when cross head 56' is in its lowermost position and vice versa.

In operation, the meat or food product to be injected is placed on the rearward end of the conveyor 14. The motor 22 is actuated as is the motor 28. Activation of motor 28 causes conveyor 14 to be activated so that the product 16 is conveyed from the rearward end of the conveyor to the forward end of the conveyor or from left to right as viewed in FIG. 1. Activation of motor 28 also causes shafts 42 and 44 to be rotated. Activation of motor 22 causes the pump 24 to supply injection fluid such as pickling brine or the like to the cross heads or fluid manifolds 56 and 56'.

As the product 16 is moved from the rearward end of the conveyor to the forward end of the conveyor in a continuous fashion, the rotation of shafts 42 and 44 causes connecting rods 80 and 80' to be moved upwardly and downwardly as previously described. The linkage connecting the shaft 44 to the cross head 56 causes the cross head to be moved in a generally circular pattern. For example, cross head 56 is shown in almost its uppermost position in FIG. 3. As crank arm 152 moves connecting rod 80 upwardly, guide 88 slides within bars 100 and 102. The pivotal connection of the shafts 58 and 60 to the upper frame 54 causes the cross head 56 to be inclined slightly forwardly as the connecting rod 80 moves to its uppermost position. As crank rod 152 rotates counterclockwise past its upwardly extending position, connecting rod 80 will begin to move downwardly which will cause the cross head 56 to be inclined rearwardly during the downward stroke of the connecting rod 80. FIG. 3 illustrates the cross head 56 in the rearwardly extending position during the downward movement of the connecting rod 80. The pivotal connection between the connecting rod 80 and the cross head 56 permits the cross head 56 to move or pivot forwardly with the food product 16 as the food product is passing therebeneath and as the injector needles are penetrating the food product. Thus, the linkage connecting the shafts 42 and 44 with the cross heads permits the conveyor to be moved in a continuous fashion thereby insuring that the food product will remain in frictional engagement with the conveyor to achieve the most efficient conveying of the same.

Although injection fluid is constantly supplied to the individual fluid manifolds 104, injection fluid is only supplied to the upper ends of the injection needles 130 when the rod 118 has moved upwardly from the upper end of reduced diameter portion 112 of bore 108. Thus, when the cross head 56 is initially lowered with respect to the conveyor, rod 118 remains in the position illustrated in FIG. 5 until the plate 136 has engaged the upper portion of the product 16 and the individual fluid manifold 104 has over-travelled plate 136 or moved downwardly with respect thereto so that fluid can pass through port 120, reduced diameter portion 112, enlarged diameter portion 114 and into the upper ends of the needle bores 128. It can be seen that the needles must therefore penetrate the product a predetermined depth before injection fluid is supplied to the needle to insure maximum fluid retention within the product. The "lost" motion between the stripper plate assembly and thefluid manifold is also present as the injector needles are being raised out of engagement with the product. The spring 150 yieldably urges the bar 142 downwardly as the fluid manifold is being raised relative to the product so that the needles are efficiently stripped from the product. As the fluid manifold 104 is being raised relative to the stripper plate assembly, fluid will be supplid to the needles 130 until O-ring 126 is again located in the reduced diameter portion 112 thereby preventing fluid flow to the needles.

The fluid pressure within the bores 128 cause the needles 130 to be in their lowermost injection position due to the pressure exerting downward force on the head 132 of the needles 130. If the needles 130 should strike an obstruction such as a bone or the like in the product, the needles 130 will move upwardly within their respective bores to prevent breakage to the needle or needles.

It has also been found that more efficient fluid injection is obtained by providing a large number of the fluid manifolds 104 and the individual stripping plate assemblies as previously described.

A great deal of vibration is also eliminated in the machine of this invention due to the fact that the cross heads 56 and 56' are 180° out of phase with each other so that one cross head is being raised while the other cross head is being lowered so that the inertia of one neutralizes the inertia of the other to cause a smooth operation, even at a comparatively fast rpm.

FIGS. 9–12 show an alternate embodiment of the meat injection means. The main body of the machine, including the machine frame, fluid manifold supporting frame, connecting rods, and conveyer means, is identical to that previously described. Alternate means for transferring the injection fluid from the source to the needle is shown in FIGS. 9–12.

The fluid manifolds 104 have a vertically disposed bore 108 having a lower bore portion 110, and intermediate reduced bore portion 112 and an enlarged bore portion 114. Bore 108 also has a first annular groove 160 in communication with horizontal bore 120 and a second annular groove 162 which may have a bevelled edge 163. Second annular groove 162 is in communication with vertical needle bores 128 by way of passageways 164. Passageways 164 terminate in reservoirs 165, which in turn are in communication with vertical needle bores 128.

Shaft 118 extends through bore 108 and has a slidable collar 166 having an annular groove 168 with bevelled edges 170. Collar 166 of shaft 118 comprises an enlarged diameter portion 172 and a reduced diameter portion 174.

Fixed by pin 176 to shaft 118 above the fluid manifold 104 is a second collar 178 which releasably maintains collar 166 of shaft 118 in a lowermost position when plate 180 of fluid manifold 104 engages second collar 178. A compressed spring 182 extending through first collar 166 of shaft 118 and having its lower end abutting the lower end of reduced bore portion 112 and its upper end abutting reduced diameter portion 174 of collar 166 upwardly urges collar 166 of shaft 118 to an uppermost position in contact with plate 180 mounted on fluid manifold 104. When collar 166 of shaft 118 is in its uppermost position annular groove 168 of collar 166 is in fluid communication with first and second annular grooves 160 and 162, respectively, of fluid manifold 104. When collar 166 of shaft 118 is in its lowermost position, a first O-ring 184 located on collar 166 prevents fluid from dripping down along bore 108 from annular groove 168 of collar 166. A second O-ring 186 located on fluid manifold 104 prevents fluid from passing directly from first annular groove 160 of fluid manifold 104 to second annular groove 162 of fluid manifold 104 when annular groove 168 is not in communication therebetween. A third O-ring 188 located on fluid manifold 104 prevents fluid from escaping second annular groove 162 and passing into bore 108.

In operation, when fluid manifold 104 moves downward, plate 136 contacts the meat product and the upper end of reduced diameter portion 174 of collar 166 of shaft 118 moves out of retentive engagement with second collar 178. Accordingly, spring 182 urges collar 166 upward so that annular groove 168 of collar 166 is in communication with both first and second annular grooves 160 and 162 of fluid manifold 104. Fluid passes from horizontal bore 120 into annular grooves 160, 168, and 162 respectively. The fluid then passes into passageways 164 which terminate in reservoirs 165, which in turn are in communication with vertical needle bores 128. When fluid manifold 104 moves upwardly so that needles 130 are withdrawn from the meat product, second collar 178 contacts reduced diameter portion 174 of collar 166 of shaft 118 so that collar 166 is forced downward, thus compressing spring 182 and moving annular groove 168 of collar 166 out of communication with first and second annular grooves 160 and 162 of fluid manifold 104.

Thus, it can be seen that the invention accomplishes at least all of its stated objectives.

I claim:

1. A machine for injecting fluids into food products and the like, comprising, a support means having a conveyor means movably mounted thereon for conveying the food product from one end thereof towards the other end thereof, a fluid manifold means movably mounted above said conveyor means and being movable between upper and lower positions with respect to the conveyor means, a first power means for reciprocatably moving said fluid manifold means between its upper and lower positions, said fluid manifold means having a plurality of injecting needles extending downwardly therefrom adapted to pierce the food product thereunder when said fluid manifold means is in its said lower position, a stripper plate means operatively connected to said fluid manifold means for movement therewith during at least the initial portion of the downward travel of said fluid manifold means, said fluid manifold means continuing to move downwardly relative to said stripper plate means to over-travel said stripper plate means after said stripper plate means has engaged the food product, said stripper plate means including a stripper stem mounted thereon for movement therewith and extending upwardly therefrom, said fluid manifold means including a vertically disposed bore formed therein having upper and lower end portions which slidably receive said stripper stem, said bore having a first intermediate bore portion above said lower end portion, said bore having a second intermediate bore portion above said second intermediate bore portion and having a larger diameter than said first intermediate bore portion, said fluid manifold means having a plurality of vertically disposed needle bores formed therein, the upper end of said needle bores being in fluid communication with said second intermediate bore portion, said fluid manifold means having a passageway means formed therein which is in fluid communication with a source of injection fluid under pressure and with said first intermediate bore portion, said stripper stem being movable between upper and lower positions relative to said vertically disposed bore, means yieldably normally maintaining said stripper stem in its said lower position, said stripper stem having a seal means mounted thereon which sealably engages the wall surface of said first intermediate bore portion, when said stripper stem is in its said lower position, to prevent injection fluid from being supplied to said needles, said seal means being positioned on said stripper stem so that said needles will penetrate the food product a predetermined depth prior to injection fluid being supplied to said needles.

2. The machine of claim 1 wherein said stripper plate assembly comprises a stripper plate having a plurality of needle openings formed therein which receive said needles, the lower end of said needles being positioned closely adjacent said stripper plate until said stripper plate engages the food product.

3. The machine of claim 2 wherein a relatively large number of individual fluid manifolds are movably mounted over said conveyor means, each of said individual fluid manifolds having a stripper plate assembly mounted thereon.

4. A machine for injecting fluids into food products and the like, comprising, a support means having a conveyor means movably mounted thereon for conveying the food product from one end thereof towards the other end thereof, a fluid manifold means movably mounted above said conveyor means and being movable between upper and lower positions with respect to the conveyor means, a first power means for reciprocatably moving said fluid manifold means between its upper and lower positions, said fluid manifold means having a plurality of injecting needles extending downwardly therefrom adapted to pierce the food product thereunder when said fluid manifold means is in its said lower position, a stripper plate means operatively connected to said fluid manifold means for movement therewith during at least the initial portion of the downward travel of said fluid manifold means, said fluid manifold means continuing to move downwardly relative to said stripper plate means to over-travel said stripper plate means after said stripper plate means has engaged the food product, said stripper plate means including a stripper stem mounted thereon for movement therewith and extending upwardly therefrom, said stripper stem having a collar slidably mounted thereon and said collar having an annular groove, said fluid manifold means including a vertically disposed bore formed therein having upper and lower end portions which slidably receive said stripper stem, said bore having a first intermediate bore position above said lower end portion, said bore having a second intermediate bore portion above said second intermediate bore portion and having a larger diameter than said first intermediate bore portion, and said bore having first and second annular grooves, said fluid manifold means having a plurality of vertically disposed needle bores formed therein, the upper ends of said needle bores being in fluid communication with said second annular groove, said fluid manifold means having a passageway means formed therein which is in fluid communication with a source of injection fluid under pressure and with said first annular groove, separate means yieldably urging said collar of said stripper stem between upper and lower positions with respect to said first and second annular grooves of said fluid manifold, said annular groove of said collar fluidly connecting said first and second annular grooves of said fluid manifold when said collar is in said upper position, said stripper stem being movable between upper and lower positions relative to said vertically disposed bore, means yieldably normally maintaining said stripper stem in its said lower position.

5. The machine of claim 4 wherein said collar has a seal means mounted thereon which sealably engages the wall surface of said second intermediate bore portion to prevent injection fluid from entering said second intermediate bore portion.

6. The machine of claim 4 wherein said fluid manifold has a first and second seal means mounted thereon which sealably engages the wall surface of said second intermediate bore portion, said second seal means preventing injection fluid from entering said second intermediate bore portion and said first seal means preventing injection fluid from entering said second annular groove when said collar is in its said lower position.

7. The machine of claim 4 wherein said annular groove of said collar being positioned on said collar so that said needles will penetrate the food product a predetermined depth prior to injection fluid being supplied to said needles.

8. A machine for injecting fluids into food products and the like comprising, a support means having a conveyor means movably mounted thereon for conveying the food product from one end thereof towards the other end thereof, a pair of fluid manifold means longitudinally spaced and rotatably mounted above said conveyor means and being rotatably movable between upper and lower positions with respect to the conveyor means, means for reciprocatably and rotatably moving said fluid manifold means between upper and lower positions, means linking said manifold means to constantly maintain the relative postions of said pair of fluid manifold means with respect to each other as said pair of fluid manifold means are reciprocatably and rotatably moved, said fluid manifold means having a plurality of injecting needles extending downwardly therefrom adapted to pierce and to inject fluid from said fluid manifold into the food product on said conveyor means.

9. The machine of claim 8 wherein said means linking said manifold means includes a pair of crank arms operatively and rotatably secured to said support means.

10. The machine of claim 8 wherein said conveyor means continuously moves the food product from the rearward end thereof towards the forward end thereof.

11. The machine of claim 8 wherein each of each pair of fluid manifold means is comprised of a plurality of individual fluid manifolds individually connected to said conduit means, and a stripper plate assembly operatively connected to each of said individual fluid manifolds for movement therewith said fluid manifold continuing to move downwardly relative to said stripper plate assembly to over-travel said stripper plate assembly after said stripper plate assembly has engaged the food product, said fluid control means including a valve means operatively connected to said stripper plate assembly.

12. The machine of claim 11 wherein each of said stripper plate assemblies comprises a plate having a plurality of needle openings formed therein through which said needles extend, a rod secured to said plate and extending upwardly therefrom through an elongated bore formed in said fluid manifold, said rod being movably received by said bore, the upper and lower ends of said bore having seal means which sealably embrace said rod, said bore having a reduced diameter portion at its lower end above the seal means adjacent therto, said reduced diameter portion being in fluid communication with said conduit means, said bore being in fluid communication with said injection needles above said reduced diameter portion, and an O-ring mounted on said rod which sealably embraces the reduced diameter portion of said bore during the initial movement of said needles with respect to said plate so that injection fluid will not be injected into the food product until said plate has engaged the upper portion of the food product and said needles have penetrated said food product a predetermined depth.

13. The machine of claim 12 wherein each of said needles is movably mounted in a vertical needle bore formed in said fluid manifold, each of said needles including means at the upper end thereof which is responsive to the fluid pressure in said needle bore to yieldably urge said needle downwardly, with respect to said needle bore.

14. The machine of claim 8 wherein a guide assembly is mounted on said frame means at opposite ends of each of said pair of fluid manifold means, each of said guide assemblies comprising a pair of vertically disposed and track means, a guide vertically movably received in said track means, a connecting rod horizontally pivotally connected at its upper end to said guide, said connecting rod being horizontally pivotally connected, below its pivotal connection with said guide, to one end of the associated fluid manifold means, a crank arm horizontally pivotally connected to the lower end of said connecting rod, a horizontally disposed shaft mounted on said frame means, said crank arm being connected to said shaft whereby rotation of said shaft causes the associated fluid manifold means to be moved between its upper and lower positions.

15. The machine of claim 14 wherein said shaft is positioned directly below said guide, said crank arm extending transversely outwardly from said shaft.

16. A machine for injecting fluids into food products and the like, comprising, a support means having a conveyor means movably mounted thereon for conveying the food product from the rearward end thereof towards the forward end thereof, a first fluid manifold means movably mounted above said conveyor means and being movable between upper and lower positions with respect to the conveyor means, a second fluid manifold means movably mounted above said conveyor means rearwardly of said first fluid manifold means towards said rearward end of said conveyor means and being movable between upper and lower positions with respect to the conveyor means, a first power means for reciprocatably moving said first and second fluid manifold means between their upper and lower positions, linkage means connecting said power means and said first and second fluid manifold means whereby said 23. The machine of claim 20 wherein each of said stripper plate assemblies comprises a plate having a plurality of needle openings formed therein through which said needles extend, a rod secured to said plate and extending upwardly therfrom through an elongated bore formed in said fluid manifold, said rod being movably received by said bore, the upper and lower ends of said bore having seal means which sealably embrace said rod, said bore having a reduced diameter portion at its lower end above the seal means adjacent thereto, said reduced diameter portion being in fluid communication with said conduit means, said bore being in fluid communication with said injection needles above said reduced diameter portion, and on O-ring mounted on said rod which sealably embraces the reduced diameter portion of said bore during the initial movement of said needles with respect to said plate so that injection fluid will not be injected into the food product until said plate has engaged the upper portion of the food product and said needles have penetrated said food product a predetermined depth.

24. The machine of claim 23 wherein each of said needles is movably mounted in a vertical needles bore formed in said fluid manifold, each of said needles including means at the upper end therof which is responsive to the fluid pressure in said needle bore to yieldably urge said needle downwardly, with respect to said needle bore.

25. The machine of claim 20 wherein a guide assembly is mounted on said frame means at opposite ends of each of said first and second fluid manifold means, each of said guide assemblies comprising a pair of vertically disposed and track means, a guide vertically movably received in said track means, a connecting rod horizontally pivotally connected at its upper end to said guide, said connecting rod being horizontally pivotally connected, below its pivotal connection with said guide, to one end of the associated fluid manifold means, a crank arm horizontally pivotally connected to the lower end of said connecting rod, a horizontally disposed shaft mounted on said frame means, said crank arm being connected to said shaft whereby rotation of said shaft causes the associated fluid manifold means to be moved between its upper and lower positions.

26. The machine of claim 25 wherein said shaft is positioned directly below said guide, said crank arm extending transversely outwardly from said shaft.

27. A machine for injecting fluids into food products and the like comprising, a support means having a conveyor means movably mounted thereon for conveying the food product from one end thereof towards the other end thereof, a pair of fluid manifold means longitudinally spaced and movably mounted above said conveyor means and being movable between upper and lower positions through an arcuate path with respect to the conveyor means, means for reciprocatably and arcuately moving said fluid manifold means between upper and lower positions, means linking said manifold means to constantly maintain the relative positions of said pair of fluid manifold means with respect to each other as said pair of fluid manifold means are reciprocatably and arcuately moved, said fluid manifold means having a plurality of injecting needles extending downwardly therefrom adapted to pierce and to inject fluid from said fluid manifold into the food product on said conveyor means.

* * * * *